United States Patent
Ono et al.

[11] 3,836,347
[45] Sept. 17, 1974

[54] CONTINUOUS PRODUCTION OF LIGHT-CONDUCTING GLASS FILAMENTS WITH REFRACTIVE INDEX GRADIENT

[75] Inventors: Seiichi Ono; Ken Koizumi; Itami Mitsugi Yoshiyagawa, all of Takarazuka, Japan

[73] Assignee: Nippon Selfoc Kabushiki Kaisha, Tokyo-To, Japan

[22] Filed: Apr. 6, 1972

[21] Appl. No.: 241,832

Related U.S. Application Data

[63] Continuation-in-part of Ser. No. 876,002, Nov. 12, 1969, abandoned.

[30] Foreign Application Priority Data
Nov. 18, 1968 Japan .............................. 43-84723

[52] U.S. Cl. ............................... 65/2, 65/3, 65/30, 65/DIG. 7, 65/86, 65/111, 204/130, 204/180
[51] Int. Cl. .... C03b 37/00, C03b 15/00, G02b 5/14
[58] Field of Search ............. 65/30, 111, 3, 4, 2, 30, 65/86; 350/96 WG, 175 GN; 204/130, 180

[56] References Cited
UNITED STATES PATENTS

| | | | |
|---|---|---|---|
| 3,218,220 | 11/1965 | Weber | 65/30 X |
| 3,393,987 | 7/1968 | Plumat | 65/30 |
| 3,486,808 | 12/1969 | Hambleh | 65/30 |
| 3,486,995 | 12/1969 | Evers | 65/30 |
| 3,505,048 | 4/1970 | Plumat | 65/30 |
| 3,607,177 | 9/1971 | Robinson et al. | 65/30 |
| 3,647,407 | 3/1972 | Robinson | 65/39 |
| 3,650,598 | 3/1972 | Kitano et al. | 65/30 |
| 3,681,041 | 8/1972 | D'Huart | 65/30 |

*Primary Examiner*—Frank W. Miga
*Attorney, Agent, or Firm*—Robert E. Burns; Emmanuel J. Lobato; Bruce L. Adams

[57] ABSTRACT

An electric current is passed by means of electrode means through a body of molten glass which is maintained at a temperature above its softening point and is flowing in contact with the electrode means to be spun continuously into a glass filament, whereby a modifying oxide is caused to have its ions undergo ion-exchange with ions which can increase or decrease the refractive index of the glass through the ion-exchange and are provided by the electrode means or is caused to undergo electrolysis by the electric current. The ion-exchanger or electrolysis is so controlled that a distribution of refractive index in which the refractive index of the glass decreases continuously from the center line and toward the outer surface of the filament is established within the filament.

7 Claims, 8 Drawing Figures

PATENTED SEP 17 1974 3,836,347

CONTINUOUS PRODUCTION OF LIGHT-CONDUCTING GLASS FILAMENTS WITH REFRACTIVE INDEX GRADIENT

CROSS REFERENCE TO RELATED APPLICATIONS

This application is a continuation-in-part of our copending application Ser. No. 876,002 filed Nov. 12, 1969, entitled "CONTINUOUS PRODUCTION OF LIGHT-CONDUCTING GLASS FILAMENTS", and now abandoned.

BACKGROUND OF THE INVENTION

1. Field of the Invention

This invention relates generally to light-conducting materials and structures, and more particularly to a new method of continuously producing light-conducting glass fibers or filaments each having a refractive index distribution in any cross section thereof perpendicular to the direction in which light is to advance wherein the refractive index decreases continuously from the center toward the outer surface.

A light-conducting fiber known heretofore comprises a core body for light conduction having a relatively high refractive index and a covering layer of relatively low refractive index covering the core body, as described hereinafter. An interface is formed between the covering layer and the core body. A light beam entering the core body through one end thereof with an angle greater than the reflection critical angle of this interface is conducted through the fiber core body, being repeatedly reflected by the interface.

A light-conducting fiber of this known clad type in which reflection is utilized, however, is accompanied by the following difficulties.

As an incident light beam introduced into this fiber repeatedly undergoes total reflection to advance through the fiber, differences in the lengths of the paths of the individual light rays develop, whereby the phase-velocity lag or staggering exists in the light beam leaving the exit end of the fiber. This phasevelocity lag causes difficulties in conducting light signals varying at high speed when this fiber is utilized in light communication.

Furthermore, as the light beam advances through the fiber with repeated reflection at the interface, its width or transverse dimension progressively spreads, and, at the same time, reflection loss occurs at the interface and constitutes another cause of lowered efficiency in light communication.

In addition, optical fiber plates and optical fiber bundles comprising several optical fibers in parallel collected arrangement are being used as means for conducting optical images, each fiber comprising a core body for light conduction of high refractive index and a covering layer of low refractive index covering the core body.

In an image-conducting means of this character, however, each individual optical fiber merely conducts light as a spot, and for this reason the resolution is determined by the diameter of the optical fibers. While it is possible to increase the resolution to some extent by decreasing the fiber diameter, there is a lower limit to the fiber diameter which can be produced, the production of optical fibers of diameters less than 10 microns being extremely difficult. Consequently, there is also a limit to the resolution which can be thus obtained. Moreover, a smaller diameter of the optical fibers entails more trouble and complication in the work of fabricating image-conducting structures from the optical fibers and thereby causes a lowering of the efficiency in this work.

The refractive index of a glass depends principally on the composition of the glass. Accordingly, by causing a glass to have a composition distribution wherein the composition varies progressively with position, a glass body wherein the refractive index varies progressively can be produced. Furthermore, a light-conducting glass fiber or filament in which the refractive index increases progressively from the outer surface toward the interior can be produced by causing a glass filament to have a composition progressively varying from the surface toward the interior. However, the production of glass structures having such composition distributions as to cause progressive variation in the refractive index has been extremely difficult.

We have previously succeeded in producing glass fibers capable of accomplishing communication by light such as laser and conduction of images (as disclosed in U.S. Pat. application Ser. No. 806,368, filed Mar. 12, 1969, entitled "LIGHT-CONDUCTING GLASS STRUCTURES AND PRODUCTION THEREOF"). These light-conducting glass fibers are produced by our previous method which comprises immersing a glass fiber composed of glass-forming oxides and glass-modifying oxides (including intermediate oxides) in a molten salt containing cations which undergo ion exchange with cations of the glass-modifying oxides within the fiber thereby to cause ion exchange, or maintaining a clad type glass fiber at a high temperature which will not deform the glass fiber thereby to cause thermal diffusion of glass-modifying oxides due to the difference in the concentrations of the glass-modifying oxides in the core glass and those in the cover glass, whereby there is established a distribution of positionally varying concentration of the glass-modifying oxides in the radial direction of the glass fiber such that the refractive index decreases progressively from the fiber center toward the outer surface.

The term "glass-forming oxide" means an oxide which can form glass, such as $SiO_2$ and $B_2O_3$; the term "glass-modifying oxide" means, in a narrow sense, an oxide which by itself cannot form glass but can form glass when it is molten in admixture in a certain proportion with a glass-forming oxide, such as $Na_2O$, $K_2O$, $Tl_2O$, $CaO$, and $BaO$; and the term "intermediate oxide" means an oxide which possesses characteristics intermediate between those of a glass-forming oxide and a glass-modifying oxide, such as $BeO$, $Al_2O_3$, and $ZnO$. It should be noted that the term "glass-modifying oxide" is herein used in a broad sense, and the term is thus intended to include an intermediate oxide.

However, in carrying out this method of first preparing a glass fiber and then subjecting it to a treatment as described above, the treatment generally requires a long time of the order of a number of tens of hours, whereby the production cost is disadvantageously high. Furthermore, the length of said fiber is relatively short because of the process step of ion exchange or thermal diffusion, and several of these short fibers must be connected end-to-end for uses such as those in laser light communication. A high level of technique is required for thus connecting these fibers, and, moreover, pulse distortion occurs at the connection interfaces whereby the accuracy of light-communication deteriorates.

SUMMARY OF THE INVENTION

It is an object of the present invention to provide a method and apparatus for continuously producing light-conducting glass filaments in which the aforementioned phase-velocity lag of the light beam at the filament exit end, spreading of the light beam width, and reflection loss are prevented, and which, therefore, are capable of accomplishing ultra-high-speed pulse multiplex communication and ultra-high-speed laser pulse amplification.

Another object of the invention is to provide a method and apparatus for continuously producing light-conducting filaments which are suitable for use in fabricating image-conducting structures of simple construction, a single filament of which is capable of conducting full optical images.

According to the present invention, briefly summarized, there is provided a method of producing continuously from molten glass light-conducting glass filaments each having the above described refractive index distribution, which method comprises passing an electric current such as direct current or pulsive current through a molten glass at a temperature above the softening point thereof by means of at least two electrode means at least one of which is directly contacting the glass or indirectly connected thereto through an electroconductive liquid thereby to establish within the resulting filament a distribution of positionally varying concentration of glass-modifying oxides and other oxides of relatively low bonding strength.

According to the present invention there is further provided apparatus for carrying out the method of the invention and light-conducting glass filaments produced thereby.

The nature, principles, details, and utility of the invention will be more clearly apparent from the following detailed description beginning with general considerations and concluding with specific examples constituting preferred embodiments of the invention when read in conjunction with the accompanying drawings.

DETAILED DESCRIPTION

Figure 1:
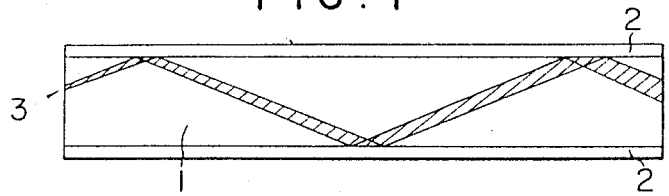
FIG. 1 is an enlarged, diagrammatic side view indicating the manner in which light is conducted through an optical fiber of conventional clad type.

As mentioned briefly hereinbefore, a light-conducting fiber of a known clad type, as illustrated in FIG. 1, comprises a core body 1 for light conduction of a relatively high refractive index and a covering layer 2 of low refractive index covering the core body. A light beam 3 entering one end of the core body 1 at an angle greater than the critical reflection angle of the interface between the core body 1 and the covering layer 2 is conducted through the core body by being repeatedly reflected at this interface.

Figure 2:
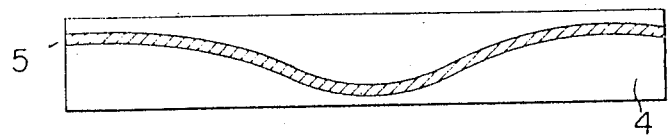
FIG. 2 is a similar diagrammatic side view indicating the manner in which light is conducted through a glass filament produced in accordance with the invention.

In contrast, when a light beam is introduced as incident light into one end of a light-conducting fiber of filament having a refractive index distribution wherein the index increases progressively from the surface toward the interior of the filament, the light beam 5 which has entered the light-conducting glass filament 4 is curved toward the direction of higher refractive index, as indicated diagrammatically in FIG. 2, and advances through the filament without being reflected at the filament surface. Accordingly, the aforementioned phase-velocity lag, spreading of the light beam width, and light reflection loss can be substantially reduced. This effect is similar to that known as the principle of the so-called gas lens.

A refractive index distribution which, in cross sections of the filament, is radially symmetrical about the center, and in which, moreover, the refractive index increases progressively from the outer surface inward is desirable since it affords a further decrease in phase-velocity lag in the light beam at the filament exit end and light beam width spread.

The most desirable distribution in a cross section perpendicular to the light advance direction is that which satisfies the following quadratic equation.

$$n = n_o ( 1 - ar^2 )$$

where:

$n_o$ is the glass refractive index at the center of the filament;

$n$ is the glass refractive index at a distance $r$ from the center; and $a$ is a positive constant, which is usually between from $2\times10\text{mm}^{-4-2}$ to $2\times10\text{mm}^{2-2}$, especially from $1\times10\text{mm}^{-3-2}$ to $1\times10\text{mm}^{2-2}$ when the distance $r$ is expressed in terms of mm. (millimeter).

When an incident light beam having a certain width is introduced into a glass filament having such a refractive index distribution, the light beam travels through the filament while retaining the original width and is directed out of the filament exit end without phase-velocity lag.

When this light-conducting glass filament is bent or deflected into a curved shape of a radius of curvature less than a certain limiting value, an incident light beam entering the filament thus deflected is reflected at the fiber surface or is transmitted therethrough to the outside. This limiting radius of curvature is determined by the refractive index distribution within the fiber, ordinarily decreasing with increasing refractive index gradient.

Figure 3:
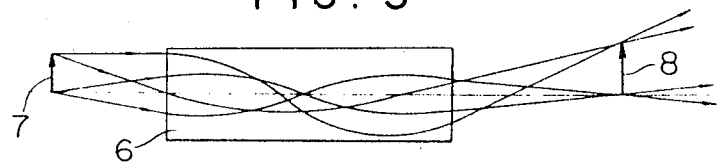
FIG. 3 is a diagrammatic side view indicating the manner in which an optical image is conducted by a glass filament produced in accordance with the invention.

The manner in which an optical image is conducted through an optical filament 6 produced in accordance with the invention is indicated diagrammatically in FIG. 3. The refractive index distribution in a cross section of this filament perpendicular to the light advance direction substantially satisfies the aforementioned relationship $n = n_o (1 - ar^2)$. Light rays from an object 7 placed in front (optically upstream) of one end of the optical filament 6 advance through the interior of the filament with respective sinusoidal paths of wavelengths S equal to $2\pi/\sqrt{2a}$ to form a real image 8 outside of the filament 6 beyond the other (light-exit) end hereof.

While this real image 8 is formed outside the filament in the example illustrated in FIG. 3, it is also possible, by suitably adjusting the length of the optical filament 6 and the distance between the object 7 and the filament, to cause the image to be formed in the transverse plane of the light-exit end of the filament and, furthermore, to adjust the magnification or reduction.

Glass filaments of the above described character can be produced rapidly and to any desired length by the method of the present invention which comprises, in the production of a glass filament from molten glass, the steps of passing a direct or pulsive current between at least two electrodes means which can be electrodes disposed in direct contact with the glass at a temperature above the softening point thereof or in indirect contact therewith through an electroconductive liquid such as a molten metal, a molten metal alloy, or a molten salt thereby to cause migration of ions of glass-modifying oxides within the glass, preferably to cause elution of cations into the molten glass from the anode side, to cause, moreover, extraction of cations within the molten glass toward the cathode side, and thereby to establish within the glass filament a concentration distribution of the glass-modifying oxides in the radial direction of the glass filament such that the refractive index decreases progressively from the filament center toward the outer surface.

In general, the refractive index of a substance has a relationship to the characteristic molecular refraction and molecular volume of that substance, the refractive index increasing with increasing molecular refraction and with decreasing molecular volume. Furthermore, the molecular refraction is proportional to the polarizability of that substance. The molecular refraction of a glass is considered to be representable as an approximation by the sum of the individual ionic refractions. Therefore, the qualitative effect of the presence of certain ions on the refractive index of a glass can be determined by comparing the values of the electron polarization per unit volume of the pertinent ions or the values of (electron polarizability)/(ion radius)$^3$ within the glass.

Each kind of ions has a characteristic ratio of electron polarizability to (ion radius)$^3$ within the glass. Accordingly, when the refractive index of a glass containing glass-modifying oxides is compared with the refractive index of a glass in which the cations constituting the modifying oxides has been partially or wholly substituted by cations of a ratio of (electron polarizability)/(ion radius)$^3$ which is smaller than that of the first mentioned cations, it is found that the latter refractive index is less than the former refractive index.

The cations in the order of their magnitudes of contribution to increase in the above mentioned ratio or refractive index within a glass are, for example, $Tl > Li > K \approx Na \approx Rb$ in the case of monovalent cations and $Pb > Ba > Cd > Sr > Ca > Zn > Be > Mg$ in the case of divalent cations.

Similarly, when first cations constituting a modifying oxide of a glass are substituted by second cations having a greater value of the characteristic ratio of (electron polarizability)/(ion radius)$^3$ than the first cations, the glass refractive index assumes a high value at the parts where this substitution has been caused. Furthermore, even when the cations constituting the modifying oxide are not substituted, a varying concentration distribution of modifying oxides within the glass can be established within certain glasses such as silicate glasses and borate glasses since the refractive indexes of these glasses increase with increase in the quantities of the glass-modifying oxides, whereby a varying refractive index distribution can be established. For convenience of nomenclature and without limitation ions which tend to increase the refractive index may be referred to as high refractive index ions and ions which tend to decrease the refractive index may be referred to as low refractive index ions.

When a glass filament is immersed in a molten salt containing cations differing from the cations of the principal modifying oxide of the glass, ion exchange takes place, but the rate thereof is extremely low. When two separate bodies of a molten salt are caused to contact respective opposite sides of a glass body as electrodes, and a direct current is passed through the glass body, cations within the salt dissolve into the glass body from the molten salt on the anode side, and cations of a glass-modifying oxide dissolve into the molten salt on the cathode side from the glass body.

The velocity of this ion migration is much higher than that in the case of a mere ion exchange, but when the glass body being treated is at a temperature below the softening point thereof, its viscosity is high, and the migration velocity has a natural upper limit. The velocity of migration of cations within a glass due to passage of electric current therethrough depends on the viscosity of the glass. The viscosity of a glass decreases rapidly with increasing temperature.

The present invention provides a method and apparatus for continuously producing glass filaments wherein a current is passed through a glass while the glass is at a high temperature above its softening point thereby to cause cations of the glass-modifying oxide to migrate rapidly, preferably cations to undergo rapid elution from the anode side into the glass in molten state and, at the same time, cations within the molten glass to be extracted rapidly toward the cathod side and forming a glass filament from this molten glass thereby to establish a concentration distribution of the modifying oxides within the glass filament in the radial direction thereof. As a result, glass filament having a refractive index distribution wherein the index decreases in a continuous manner in the radial direction of the filament from the central axis toward the outer surface is produced continuously.

The production of glass filament according to the present invention is substantially the same as those which are conventional in the art, except that a pair of electrode means is arranged in a specific way. As illustrated in FIGS. 4 to 7, the electrode means is arranged so that a first electrode means is in contact with and surrounds an area of the surface of the bath of molten glass out of which a glass filament is drawn, the area being a continuation of and near the surface of the glass filament, and a second electrode means is in contact with the bath of molten glass and opposite to the first electrode means. Electric voltage is applied across the electrode means to cause an electric current to flow through a body of molten glass between the electrode means.

In the case where the application of electric voltage is effected so that the polarity of the first electrode means is to be more positive than the second electrode means the first electrode means contains first cations which can produce glass having a reduced refractive index by exchanging exchangeable second cations which have originally been contained in the molten glass, and electric current passes from the first electrode means to the second electrode means through the molten glass therebetween. The second electrode means is selected so that said second cations within the molten glass can dissolve thereinto. Transfer and diffusion first cations the firscations to the second electrode means through the molten glass in contact with the first electrode means are promoted by the applied electric voltage. At the same time, transfer and diffusion of the second cations within the molten glass to the second electrode means are also promoted, and upon reaching the second electrode means the second cations dissolve thereinto.

Transfer or migration of the first cations and the second cations toward the second electrode means results in the abovementioned flow of electric current.

The molten glass has originally the second cations dispersed uniformly therewithin and thus has a uniform refractive index. Upon application of electric voltage as outlined above, the second cations within glass nearer the first electrode means are more replaced or exchanged by the first cations, and the glass nearer the first electrode means thus comes to have a smaller refractive index than the original one of the molten glass.

There are thus produced concentration distributions of the first cations and the second cations such that the concentration of the first cations and that of the second cations within the molten glass continuously decreases and increases, respectively, from the first electrode means toward the second electrode means. The refractive index of the glass will thus continuously decrease from the first electrode means toward the second electrode means. The concentrations of the first cations and of the second cations are, in other words, concentrations of an oxide comprising the first cations and of an oxide comprising the second cations.

To the contrary, in the case where the second electrode means is to be more positive than the first electrode means, the second electrode means contains first cations which can produce glass having an increased refractive index by exchanging exchangeable second cations which have originally been contained in the molten glass. The electric current passes from the second electrode means to the first electrode means through the molten glass. The first electrode means is selected so that said second cations within the molten glass can dissolve thereinto.

Transfer and diffusion of the first cations to the first electrode means through the molten glass in contact with the second electrode means are promoted by the applied electric voltage. At the same time, transfer and diffusion of the second cations within the molten glass to the first electrode means are also promoted, and upon reaching the first electrode means the second cations dissolve thereinto. There are thus produced concentration distributions of the first cations and the second cations such that the concentration of the first cations and that of the second cations within the molten glass continuously decreases and increases, respectively, from the second electrode means toward the first electrode means. The refractive index of the glass will thus continuously decreases from the first electrode means toward the second electrode means.

Since a body of the molten glass which body is nearer the first electrode means will produce a body of a glass filament which body is nearer the surface thereof, the glass filament will have "a distribution of refractive index wherein said index decreases continuously from the center axis toward the outer surface of the filament in any cross section thereof perpendicular to the axis" in both cases where the first electrode means is more positive and where the second electrode means is more positive.

In accordance with this invention, a light-conducting glass filament which has a refractive index differential of more than 0.01 between the center axis and the outer surface of the filament can be produced.

The extent of ion exchange between the first cations and the second cations depends substantially on the amount of electric current flowing between the first and second electrodes due to the application of electric voltage thereacross. Application of too high electric voltage will cause excessive electric current, which can in turn cause the ion exchange to occur throughout the molten glass thereby to produce a filament having no refractive index gradient. Thus, the quantity of electric current or, in other words, value of electric voltage to be applied should be so controlled that a desired refractive index gradient is produced within the filament.

In order to indicate still more fully the nature and utility of the invention, the following examples of practice constituting preferred embodiments thereof are set forth, it being understood that these examples are presented as illustrative only and that they are not intended to limit the scope of the invention.

Detailed Description of the Preferred Embodiments

Figure 4:
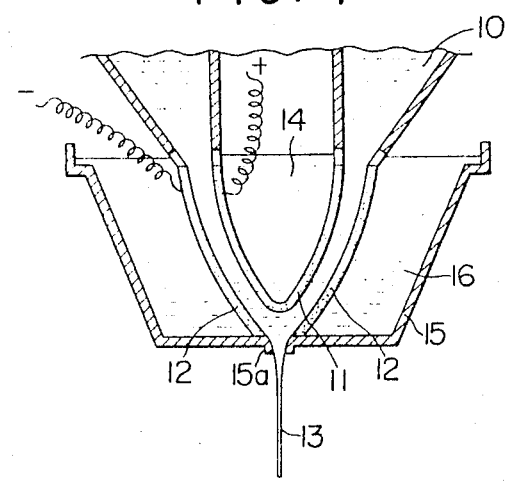
FIGS. 4 through 8, inclusive, are elevations, in vertical or axial section with parts cut off, indicating examples of practice constituting preferred embodiments of the invention.

Embodiment Illustrated in FIG. 4

In one embodiment of the invention as illustrated in FIG. 4, molten glass 10 at a temperature of 850°C, which has the composition by weight: 51.1 percent of $SiO_2$, 4.5 percent of $Na_2O$, 32.6 percent of PbO and 11.8 percent of ZnO, $Na_2O$ being a modifying oxide, and has a refractive index of 1.590 is caused to flow downward through a converging annular space between a central anode 11 made of an electroconductive porous material and a cathode 12 made of an electroconductive porous material and coaxially surrounding the anode and is spun into a glass filament 13 through a nozzle 15a.

The anode 11 made of a porous material constitutes a vessel and contains a molten metal alloy 14 containing a metal of a character such as to become cations of a glass-modifying oxide when dissolved into molten glass and, moreover, to increase the refractive index of the glass by ion exchange. Examples of the metal alloys 14 are alloys of thallium, and a preferable one is a metal alloy consisting essentially of 60 percent by weight of thallium and 40 percent by weight percent lead and having a melting point of 380°C. A vessel 15 is disposed outside the cathode 12 made of a porous material, the lower nozzle end of the cathode 12 being joined communicatively to the nozzle 15a at the bottom of the vessel 15. A molten metal alloy 16, such as an alloy of tin, e.g., an alloy consisting of tin and lead, for dissolving thereinto of cations of the modifying oxide within the molten glass is stored in the vessel 15.

When, during the process of spinning a glass filament 13 out of the molten glass 10, direct current voltage of approximately 5 volts is applied across the electrodes 11 and 12 from an electric power source not shown, a direct current of approximately 0.8 amperes is passed from the anode 11 to the cathode 12 through the molten glass flowing downward therebetween, the molten alloy 14 permeates, through the porous anode 11 and dissolves as thallium ions into the molten glass at a higher velocity produced by the electric potential. Cations of modifying oxide within the molten glass, which are sodium ions in this case reach the cathode 12, give their electirc charge to the cathode, are extracted perhaps in the form of metallic sodium at the porous cathode 12 and, permeating therethrough, dissolve into the molten alloy 16. If desired, the glass which exists between the electrodes 11 and 12 may be maintained at a temperature higher than the softening point thereof by means of a temperature control means, not shown, mounted outside the electrode 11.

The cations dissolving into the molten glass from the molten alloy 14 on the anode side are so selected that they increase the refractive index when they undergo substitution with cations of the modifying oxide of the molten glass. Since the concentration of the cations which increase the refractive index is higher at points nearer the anode, the glass filament 13 thus produced, which has a diameter of 0.15 mm and has been spun at a velocity of 20 m/min. with gradual cooling, has a refractive index which is of maximum value at its center and decreases progressively toward the outer surface. It is found that : The maximum value of the refractive index in this case is 1.625 and the refractive index at the outer surface is 1.590. Approximately 70 percent of sodium ions have been replaced by thallium ions at the center of the filament, but substantially no replacement of sodium ions by thallium ions has occurred at the outer surface of the filament. Concentrations of sodium ions and of thallium ions continuously increases and decreases, respectively, from the center toward the outer surface of the filament. Refractive index within the filament continuously decreases from the center toward the outer surface of the filament to the satisfaction of the quadratic equation hereinabove mentioned wherein the constant $a$ is approximately $7.7$ mm$^{-2}$.

The electroconductive porous material for the anode 11 and cathode 12 is a material which does not easily react with the glass and, moreover, is not easily eroded by the glass as, for example, porous graphite and a platinum plate material provided with a large number of perforations. The molten alloy passes through the perforations of the porous material to positions in vicinity of the surface of each electrode means facing the glass and, contacts the molten glass in a state of surface tension balance therewith. Accordingly, there is little possibility of the glass itself flowing out into the molten alloy side or of the molten alloy mixing directly into the molten glass, whereby diffusion of cations from the anode 11 toward diffusion of cations from the glass toward the cathode 12 occurs smoothly.

While the molten alloy 14 and molten alloy 16 are used in this example as a source of cations for dissolving into the molten glass and as a liquid for dissolving thereinto of a metals of cations of nidifying oxides within the molten glass, it is also possible to use molten substances such as a molten metal or a molten salt. Furthermore, while porous materials 11 and 12, themselves, are used as electrodes in this example, electrodes may be provided separately from the porous materials 11 and 12 as in the example illustrated in FIG. 5.

Furthermore, it is also possible to produce a glass filament having the aforementioned desired refractive index distribution by using the porous materials 11 and 12 with reversed polarity as the cathode and anode, respectively, selecting a glass composition of relatively high refractive index, which, for example, has the composition percent by weight: 43.3 percent of $SiO_2$, 1.3 percent $K_2O$, 17.5 percent of $Tl_2O$, 27.7 percent of PbO and 10.2 percent of ZnO; and has the refractive index 1.625, causing sodium ions, which will lower the glass refractive index when substituted for the thallium ions within the glass to dissolve through the porous material 12 into the molten glass from a sodium alloy such as that consisting by weight of 20 percent sodium and 80 percent lead separated from the molten glass by a wall of the porous material 12 constituting the anode, and causing the thallium ions within the glass to move so that the thallium ions migrate with being accelerated by the applied electric voltage toward the porous material 11 constituting the cathode and, upon reaching the porous material 11, a portion of the thallium ions becomes to metallic thallium and thereafter dissolves into a molten tin alloy separated from the molten glass by a wall of the porous material 11. Temperature of the molten glass, spinning rate of a filament, diameter of the filament, values of electric voltage and of current are substantially the same as those in the above case. It is found that: the refractive index of the center axis of the filament thus produced is approximately 1.625, the refractive index of the outer surface of the filament is approximately 1.596 with continuous decrease in refractive index from the center toward the outer surface thereof. The ion concentrations of sodium and of thallium continuously increases and decreases, respectively, from the center toward the outer surface of the filament.

Figure 5:
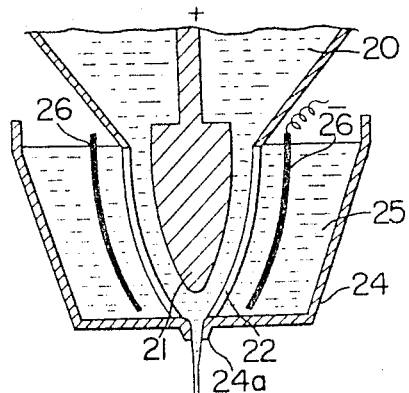

Embodiment Illustrated in FIG. 5

In another example of the invention as illustrated in FIG. 5, molten glass 20 is caused to flow downward through a converging annular space between a central anode 21 and a porous material 22 coaxially surrounding the anode and is spun into a glass filament 23 through a nozzle 24a.

The anode 21 is a solid structure of a metal or alloy of a character such as to increase the refractive index of the glass when cations from the anode 21 dissolve into the molten glass to replace cations within the glass. The porous material 22 is similar in shape to the porous material 12 in the example of FIG. 4 and is joined at its lower end communicatively to the nozzle 24a at the bottom of a vessel 24 similar to the aforementioned vessel 15. A molten metal alloy 25 is stored within the vessel 24 and is in contact with the outer surface of the porous material 22. A cathode 26 is provided within the molten alloy 25 with a coaxially surrounding, spaced apart relation to the porous material 22. The porous material 22 is not necessarily electroconductive.

In the process of forming the glass filament 23 from the glass 20, a direct current is passed from the anode 21 toward the cathode 26 through the molten glass flowing downward between the anode 21 and the porous material 22, whereupon cations such as to increase the glass refractive index when they replace the cations within the glass dissolve into the molten glass from the cathode 26, while cations of modifying oxides dissolve into the molten alloy 25 from the molten glass.

The concentration of the cations which have dissolved into the glass from the anode 21 is higher at positions nearer the anode. As a result, the glass filament 23 has a refractive index distribution wherein the index is highest at the center of the filament and decreases continuously toward the outer surface thereof.

The example described above with reference to FIG. 5 can be modified in various ways. For example, the porous material 22, in the case where it is electroconductive, may be adapted to function as the cathode instead of providing the cathode 26, and it is possible to use a molten substance such as a molten metal or molten salt of a single ingredient in place of the molten alloy 25.

Furthermore, by selecting a glass composition of a relatively high refractive index, using an anode 21 of a construction similar to that of the example shown in FIG. 4 as the cathode, providing and using as the anode a side wall of a metal or alloy for causing dissolution into the glass of cations of a character such as to lower the refractive index of the glass when dissolved in the molten glass to displace the cation therewithin in place of the porous material 22, and passing a direct current in the direction reverse to that of the example shown in FIG. 5, it is also possible to produce a glass filament having the aforementioned desired refractive index distribution.

While, in the examples described above and illustrated in FIGS. 4 and 5, the molten glass is caused to flow downward and be spun downward into a glass filament, the glass filament can also be spun by drawing the molten glass upward by means of apparatus similar to those of the preceding two examples. Furthermore, while in these two examples, a porous material is provided on the cathode side, and cations undergoing elution from within the molten glass are caused to dissolve into a melt such as a molten alloy provided on the outer side of the porous material, it is also possible to establish the desired refractive index distribution without providing a porous material and with only extraction at the cathode of cations in the glass in the form of a metal.

Figure 6:
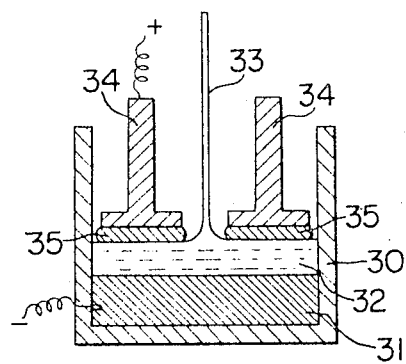
Figure 7:
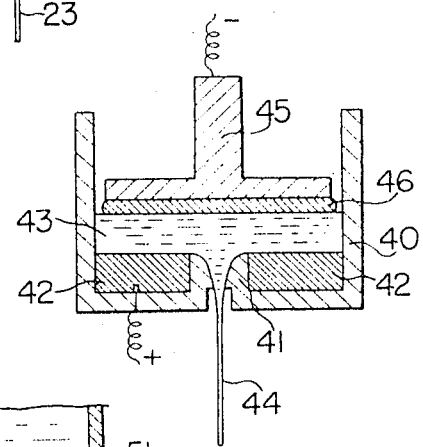

Embodiments Illustrated in FIGS. 6 and 7

Embodiments of the invention differing from those described above and illustrated in FIGS. 4 and 5 are shown in FIGS. 6 and 7. In the example shown in FIG. 6, a molten metal alloy 31 such as a tin alloy having a higher specific gravity than molten glass is stored in a vessel 30, and a molten glass 32 the composition percent by weight of which is 48 percent of $SiO_2$, 12 percent of $Na_2O$, 16 percent of $Tl_2O$ and 24 percent of PbO and temperature of which is 800°C is stored in the same vessel above the molten alloy 31. From the central upper part of the body of the molten glass 32, a glass filament 33 is drawn upward and taken up by take-up means (not shown). An annular body of a molten salt $KNO_3$ 35 is supported by surface tension by an annular electrode 34 in a manner to surround the lower part of the glass filament 33 above the molten glass 32.

The salt 35 is a salt containing a cation of a character such as to lower the glass refractive index when dissolved as $K^+$ ions into the glass and caused to undergo substitution with the $Tl^+$ ions and $Na^+$ ions within the glass. A glass composition producing a relatively high refractive index is selected for the glass 32.

When a direct current, e.g., 10 amperes, is passed through the molten glass 32 by means of the electrode 34 used as an anode and the molten alloy 31 used as a cathode by applying approximately DC 5 volts across the electrodes, potassium ions dissolve into the molten glass 32 from the molten salt 35, and cations principally of modifying oxides, i.e., thallium ions and sodium ions, dissolve into the molten alloy 31, constituting the cathode, from the molten glass 32, wherein the dissolution of both kinds of cations are promoted by the applied voltage.

As a result, within the molten glass 32, the concentration of the potassium ions which have dissolved into the glass from the salt 35 decreases progressively from the surface in contact with the salt 35 toward the glass interior, and the concentration of the thallium ions and sodium ions originally contained within the glass increases progressively in the same direction. The glass parts of the drawn glass filament 33 nearer the outer surface thereof are formed from the glass parts of the molten glass 32 nearer the surface thereof in contact with the molten salt 35. As a result, there is obtained a glass filament 33 such that the filament has a diameter 0.4 mm, has a refractive index at the center thereof of 1.59 which is substantially the same as the original molten glass and a refractive index at the outer surface thereof of 1.57 with a refractive index distribution such that refractive index continuously decreases from the center axis toward the outer surface of the filament. The refractive index distribution is a result of exchange of thallium ions within the glass by potassium ions outside the glass, and a refractive index distribution produced by ion exchange of sodium within the glass by potassium is negligible.

In the example shown in FIG. 7, a vessel 40 is provided at the center of its bottom with a spinning nozzle 41 which projects at its upper or upstream part into the interior of the vessel. The vessel 40 contains in its bottom interior, surrounding the upward projection of the nozzle 41, a molten alloy 42 having a higher specific gravity than molten glass and a body of molten glass 43 above and in contact with the molten alloy 42, and a glass filament 44 is spun out of the molten glass 43 as it is drawn downward through the nozzle 41.

The alloy 42 contains an ingredient of a character such as to lower the glass refractive index when it dissolves into the molten glass 43, and substitution thereby of the cations within the glass occurs. Above and in contact with the molten glass 43, there is provided a body of a molten alloy 46, which is supported through surface tension by an electrode 45.

When, with the molten alloy 42 as an anode and the electrode 45 as a cathode, a direct current is passed through the molten glass 43, cations of the above mentioned character dissolve into the molten glass 43 from the molten alloy 42 constituting the anode, while cations of modifying oxides dissolve into the molten alloy 46 from the molten glass 43.

As a result, the concentration of cations which have dissolved into the glass from the alloy decreases progressively with position, and the concentration of the cations originally contained in the glass increases progressively within the molten glass 43 both from the surface thereof in contact with the molten alloy 42 toward the interior of the molten glass. The glass part of the glass filament 44 thus drawn downward nearer the outer surface thereof is formed from the part of the molten glass 43 nearer the surface thereof in contact with the molten alloy 42. As a result, a glass filament having the aforementioned desired distribution of refractive index is produced.

When the direction of the direct current passed through each of the molten glasses 32 and 43 in the examples described above and illustrated in FIGS. 6 and 7 is reversed to cause substitution of the cations within the glass by cations from the molten alloy on the anode side, and when cations such as to increase the glass refractive index are caused to dissolve into the molten glass, and cations in the glass are caused to dissolve into the molten alloy on the cathode side from the molten glass, the concentration of the ions dissolved into the glass from the alloy decreases progressively and the concentration of the cations originally contained in the glass increases progressively within the molten glass from the surface thereof in contact with the molten alloy on the anode side toward the molten glass interior.

In this case, the glass forming the central part of the glass filament (33 or 44) thus spun contains a relatively large quantity of the glass formerly near the surface of the molten glass in contact with the molten alloy on the anode side. As a result, therefore, a glass filament possessing the aforementioned desired distribution of refractive index is obtained.

Furthermore, while molten alloys are used as a source of cations for dissolving into molten glass and as a medium into which cations of modifying oxides within the molten glass are extracted, it is also possible to use molten substances such as molten metals and molten salts in place of molten alloys. It is also possible, moreover, to use as an anode a metal or a metal alloy in solid state of a character such as to cause cations to dissolve into the molten glass when electric current is passed therethrough.

While, in each of the examples described above and illustrated by FIGS. 4, 5, 6, and 7, cations are caused to dissolve into the molten glass from the anode side, it is also possible to produce a glass filament having the same desired distribution of refractive index by establishing within the molten glass a distribution of concentration of modifying oxides contained as components in the molten glass and of other oxides of relatively weak bonding strength by passing a direct current through the molten glass without supplying cations into the glass from the outside.

Figure 8:
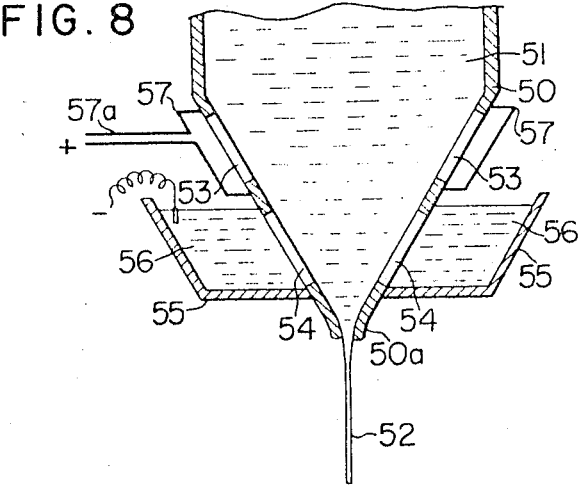

Embodiment Illustrated in FIG. 8

In still another embodiment of the invention as illustrated in FIG. 8, a distribution of concentration of cations principally of modifying oxides of a molten glass 51 contained in a vessel 50 is established by passing a direct current through the molten glass, which is then spun downward into a filament 52 thereby having the aforementioned desired refractive index distribution. In one example, the glass 51 is molten at a temperature of 870°C, has the composition percent by weight: 43.3 percent of $SiO_2$, 1.3 percent of $Na_2O$, 17.5 percent of $Tl_2O$, 27.7 percent of PbO and 10.2 percent of ZnO, wherein the $Na_2O$ and $Tl_2O$ are modifying oxides, and has a refractive index 1.625.

The vessel 50 has a conical lower wall converging downward to a nozzle 50a through which the molten glass is spun at the rate of 10 m/min. into the filament 52 of a diameter 0.2 mm. This conical lower wall is provided at its upper part with an anode 53 having an annular or frustoconical shape and made of a porous material such as, for example, a platinum sheet having numerous perforations, and at its lower part with a cathode 54 also of frustoconical shape, the anode 53 and cathode 54 forming parts of the conical lower wall of the vessel 50 and being used to pass a direct current through the molten glass 51. When DC 50 volts is applied across the anode 53 and the cathode 54, approximately 1 ampere of electric current passes through the molten glass.

The strength of the electric field established within the molten glass 51 by applying outside electric voltage is the highest in the region at the inner wall surface of the vessel 50 and decreases progressively toward the center of the molten glass 51. Within the molten glass 51, the cations and the anions of the glass-modifying oxides, i.e., Na and Tl ions and oxygen ions, respectively, move toward the cathode and the anode, respectively, and portions thereof collect respectively on the cathode and the anode. In the region wherein the strength of the electric field is higher, that is in the region at the inner wall surface of the vessel 50, the migrations of the cations (Na and Tl ions) and oxygen ions toward the cathode and the anode, respectively, will occur more intensely. Na ions and Tl ions have a tendency to migrate far more easily than oxygen ions, but since the molten glass will remain electrically neutral, the migration of Na and Tl ions which have a positive charge will be restricted by the migration of the oxygen ions which have a negative charge. The cations and the oxygen ions, in the ratio of 2 : 1 in terms of numbers of Na ions + Tl ions and oxygen ions, reach the cathode and the anode, respectively, and will lose their charges. The migrations of cations and anions result in the electric current caused by application of electric voltage.

Since the strength of the electric field within the glass near the vessel wall is high, the ions in this wall region are most strongly attracted toward the anode 53 and cathode 54, whereas, since the strength of the electric field within the glass decreases from the vessel wall toward the center of the molten glass 51, the degree with which the ions are attracted toward the electrodes is lowered. The glass flowing nearer the vessel wall will be electrolyzed more intensely by application of electric voltage, which is different from the ion-exchange on the molten glass in the examples of FIGS. 4 to 7. As a result, the concentration of the glass modifying oxides, i.e., $Na_2O$ and $Tl_2O$, decreases from the center toward the outer surface of the molten glass 51, whereby the concentration of the modifying oxides in the radial direction in the glass filament 52 thus produced assumes a distribution wherein it decreases from the center toward the outer surface of the filament. It is found that: the filament has at the center thereof substantially the same composition as the original molten glass and a refractive index of approximately 1.625, and has at the outer surface the composition by weight: 54 percent of $SiO_2$, 34 percent of PbO and 12 percent of ZnO, and a refractive index of approximately 1.606 which is smaller by 0.019 than the refractive index at the center. The refractive index within the filament continuously decreases from the center toward the outer surface thereof.

In the case of glasses such as silicate glasses and borate glasses, increasing the concentration of one modifying oxide results in an increase in the glass refractive index. When such a glass is used as the molten glass 51 in the instant example, the resulting glass filament 52 has a concentration of modifying oxides which decreases progressively from the center toward the outer surface of the filament, whereby the desired refractive index distribution is obtained.

On the outer side of the cathode 54, there is provided a vessel 55 for storing therein of a molten alloy 56 for dissolving thereinto Na and Tl metals which have been produced by the discharge of the cations of the modifying oxides extracted from the molten glass 51, the metals extracted at the cathode 54 being dissolved into this molten tin alloy 56.

Anions collect and become a gas which is mainly oxygen at the anode 53. Accordingly, an annular duct 57 is provided to cover the outer side of the anode 53 and fit tightly against the outer surface of the vessel 50 and is evacuated through a pipe 57a to remove the generated gas.

The positions of the electrodes are not necessarily limited to the wall of the vessel 50 but may be within the molten glass 51. For example, by providing a plurality of concentric cylindrical electrodes within the molten glass on the inner side of the vessel wall to cause the glass to flow past the electrodes through divided spaces therebetween, and causing larger current to flow between electrodes nearer the vessel wall, it is possible to cause the concentration of modifying oxides and other oxides of relatively weak bond strength within the molten glass to decrease progressively toward the vessel wall.

The principle of the present invention can be applied also to optical glass filaments other than those produced in the example described above with reference to FIGS. 4 through 8, inclusive. For example, by passing a direct current through a glass filament of the so-called clad type in the direction transverse to the interface between the covering glass and core glass of the filament while it is still at a high temperature above its softening point to cause migration of modifying oxides at the interface between the core glass and the covering glass and thereby to smoothen the variation of concentration of the modifying oxides, it is possible to produce a glass filament having the aforementioned desired distribution of refractive index, that is, a distribution wherein the refractive index decreases progressively from the center of the filament toward the outer surface thereof.

The composition of the glass used for the glass filament production according to the invention is not particularly limited, it being possible to use silicate glasses, borate glasses, phosphate glasses, and other oxide glasses.

In the exchange of cations in a glass, substitution of cations having a low value of the above mentioned ratio in the glass with cations of a high value of this ratio, e.g., $Tl^+$, results in an increase in the refractive index of the glass. Conversely, substitution of cations of a large ratio value with cations of a low value, e.g., $Na^+$, results in a lowering of the glass refractive index.

While it is possible to use cation sources in various forms such solids of metals and metal alloys, molten metal alloys, molten metals, and molten salts as cations for dissolving into the molten glass from the anode side in the above described examples illustrated in FIGS. 4 through 7, inclusive, we have found that cations in liquid state are desirable in view of factors such as stable supply of ions to the molten glass.

We have found further that, while the characteristics required of the source of cations to be dissolved into the glass differ with differences in factors such as the glass composition, the desired refractive index gradient, and the process temperature, particularly molten alloys are convenient among liquids since in using alloys it is possible to select alloys satisfying these characteristics from among literally countless combinations of various metals. The cations in the molten glass are extracted at the cathode and become a metal, and we have found that when a molten metal or molten alloy is used as a material in liquid state into which the extracted metal is to be dissolved, it readily and desirably becomes an alloy with the metal. A molten salt as a cation-source is advantageous in that it permeates easily through the porous material.

The magnitude of the direct current to be passed through the molten glass in the examples described above with reference to FIGS. 4 through 8, inclusive, is greatly influenced by factors such as the diameter of the glass filament to be formed, the filament spinning speed, the required refractive index gradient, the glass composition, the kinds of cations participating in the ion exchange, the glass viscosity at the time of the process, and shape of the apparatus, whereby we have found the optimum magnitude of the current to be used differs from case to case. We have found further that, in the case where a molten metal or molten alloy is used, it is preferable to use a non-oxidizing atmosphere for the gaseous phase to contact this molten metal or alloy so as to prevent oxidation of this liquid metal or alloy.

As is apparent from the above description with respect to examples of the invention, the present invention provides a method of continuously producing glass filaments in each of which the refractive index decreases continuously from the center toward the outer surface of the filament. Moreover, it is possible to produce continuously glass filaments each having an ideal refractive index distribution which substantially satisfies the aforementioned equation $n = n_o(1 - ar^2)$ by appropriately adjusting variables such as the shapes of the electrodes, the strength of the direct current passed through the molten glass, and the kinds of cations constituting modifying oxides.

When an incident light beam is introduced into one end of a piece of a glass filament produced in the above described manner according to the invention, the glass filament functions as a light-conducting fiber whereby the path of advance of the light beam is curved without reflection of the light beam within the fiber. That is, the light thus introduced into the glass fiber advances as it is curved toward the side of higher refractive index as viewed in the direction of light advance.

Therefore, by using a light-conducting filament or fiber ascording to the invention, it is possible to bend or curve the direction of light advance. Furthermore, a light-conducting glass fiber having a refractive index distribution which is radially symmetrical about the central axis in any cross section of the fiber perpendicular to the direction of light conduction, and in which, moreover, the refractive index decreases with increasing distance from the central axis can be caused to function as a convex lens such as to focus light beams.

Since a light beam introduced into a light-conducting glass fiber produced by the method of the invention advances through the fiber without being reflected, phase-velocity lag of the light beam leaving the exit end of the fiber does not occur, and, furthermore, spreading of the light beam width is prevented. Accordingly, a light-conducting glass filament produced in accordance with the invention can be utilized in light communication to conduct efficiently light signals which vary at high speeds. Furthermore, glass filaments produced by the method of the invention can be utilized for communication by light such as laser light, various image-transmitting techniques, and other light-conducting techniques.

What we claim is:

1. A method of continuous production of a light-conducting glass filament having a distribution of refractive index wherein said index decreases continuously from the center axis toward the outer surface of the filament in any cross section thereof perpendicular to the axis, which comprises:
   a. providing a bath of molten glass containing high refractive index cations;
   b. drawing molten glass continuously out of a first area of a surface of the bath of molten glass to form a glass filament which is gradually cooled;
   c. positioning an annular first electrode means in contact with an annular second area of said surface surrounding said first area of said surface of the bath of molten glass out of which the filament is drawn, said second area being a continuation of said first area and closely surrounding the glass filament being drawn whereby the glass of said second area flows into said first area and is drawn into said filament so as to produce the outer surface of the glass filament, said first electrode means containing low refractive index cations that are exchangeable with said high refractive index cations within the molten glass to cause the refractive index of the glass to decrease through the exchange;
   d. positioning a second electrode means in contact with the bath of molten glass spaced from said surface and located centrally of the first electrode means, said second electrode means being so arranged that molten glass nearer the second electrode means is drawn into said filament so as to produce the central portion of the glass filament, said second electrode means having the capacity of receiving said high refractive index cations from the molten glass;
   e. applying a unidirectional electric voltage across the first and the second electrode means so that the polarity of the first electrode means is positive with respect to the second electrode means to cause an electric current to flow through a portion of the molten glass from the first electrode means to the second electrode means thereby to promote transfer and diffusion toward said second electrode means of said low refractive index cations into the molten glass in contact with the first electrode means and thereby promote diffusion toward and transfer to said second electrode means of said high refractive index cations in the body of molten glass; whereby said high refractive index cations originally contained within the part of the molten glass nearer the first electrode means are exchanged to a greater extent by said low refractive index cations thereby to reduce to a greater extent the refractive index of the part of the molten glass nearer the first electrode means so that concentration distributions are produced within the molten glass such that the concentration of said low refractive index cations continuously decreases and the concentration of said high refractive index cations continuously increases, respectively, from said first electrode means toward said second electrode means whereby concentrations within the glass filament of said low refractive index cations continuously increases and said high refractive index cations continuously decreases from the center axis toward the outer surface of the filament in any cross section thereof perpendicular to the center axis thereof, the progressive variation in concentrations of said high refractive index cations and said low refractive index cations within the glass filament producing said distribution of refractive index as said filament is being formed.

2. A method according to claim 1, in which said annular first electrode means surrounds said second electrode means to form between said electrode means an annular passageway through which molten glass is drawn to form said filament.

3. A method according to claim 1, in which annular first electrode means covers a portion of said surface out of which said filament is drawn and has a hole through which said filament is drawn, said second electrode means being positioned in contact with said bath of molten glass and disposed spaced from the opposite to said annular first electrode means.

4. A method of continuous production of a light-conducting glass filament having a distribution of refractive index wherein said index decreases continuously from the center axis toward the outer surface of the filament in any cross section thereof perpendicular to the axis, which comprises:
   a. providing a bath of molten glass containing low refractive cations;
   b. drawing molten glass continuously out of a surface of the bath of molten glass to form a glass filament which is gradually cooled;
   c. positioning an annular electrode means in contact with and surrounding an area of the surface of the bath of molten glass out of which the filament is drawn, the area being a continuation of and near the surface of the glass filament, the glass of the area being to produce the outer surface of the glass filament being drawn after having moved by the drawing, said annular first electrode means being such that it can have low refractive index cations within the molten glass dissolve into said annular electrode means;
   d. positioning a second electrode means in contact with the bath of molten glass spaced from said surface and opposite to the first electrode means, said second electrode means being so arranged that a part of the molten glass nearer the second electrode means will produce glass nearer the center of the glass filament after having moved by the drawing of said filament, said second electrode means containing high refractive index cations that can exchange with exchangeable low refractive index cations within the molten glass and thereby cause the refractive index of the glass to increase through the exchange;

e. applying a unidirectional electric voltage across the first and the second electrode means, the application of said electric voltage being effected so that the polarity of the second electrode means is positive with respect to the first electrode means to cause an electric current to flow through a body of molten glass from the second electrode means to the first electrode means thereby to promote transfer and diffusion toward said first electrode means of said high refractive index cations into the body of molten glass in contact with the second electrode means and thereby to promote transfer and diffusion toward said first electrode means of said low refractive index cations into the body of molten glass;

f. whereby said low refractive index cations originally contained within the part of the molten glass nearer the second electrode means are exchanged to a greater extent by the high refractive index cations thereby to increase to a greater extent the refractive index of the part of the molten glass nearer the second electrode means so that concentration distributions are produced within the molten glass such that the concentration of said high refractive index cations continuously increases from said first electrode means toward said second electrode means, and the concentration of said low refractive index cations decreases from said first electrode means toward said second electrode means and whereby the concentration within the glass filament of said high refractive index cations decreases and the concentration of said low refractive index cations increases continuously from the center axis toward the outer surface of the filament in any cross section thereof perpendicular to the center axis thereof, the variations in concentrations of said high refractive index cations and said low refractive index cations within the glass filament producing said distribution of refractive index.

5. A method according to claim 4, in which said annular first electrode means surrounds said second electrode means to form between said electrode means an annular passageway through which molten glass is drawn to form said filament.

6. A method of continuous production of glass filament as claimed in claim 4, in which said annular first electrode means covers a portion of said surface out of which said filament is drawn, and has a hole through which said filament is drawn, said second electrode means being in contact with said bath of molten glass and disposed spaced from and opposite to said annular first electrode means.

7. A method of continuous production of a light-conducting glass filament having a distribution of refractive index wherein said index decreases continuously from the center axis toward the outer surface of the filament in any cross section thereof perpendicular to the axis, which comprises:

a. providing a bath of molten glass containing cations and anions which can diffuse within the molten glass, said glass being so selected that, when the cations and the anions are selectively removed from it, it will have a smaller refractive index than that of the original glass;

b. drawing molten glass continuously out of a surface of the bath of molten glass to form a glass filament which is gradually cooled;

c. positioning a first and a second electrode means in contact with the molten glass of said bath, one of said electrode means surrounding an area of the surface of the bath of molten glass out of which the filament is drawn, said area being a continuation of and near the surface of the glass filament, the glass of the area being to produce the outer surface of the glass filament after having moved by the drawing of said filament, said electrode means being arranged concentrically and the first electrode means and the second electrode means respectively being capable of selectively extracting out of the glass the anions and the cations which collect there;

d. applying a unidirectional electrical voltage across the first and the second electrode means, the application of said electric voltage being effected so that the polarity of the first electrode means is positive with respect to the second electrode means to cause an electric current to flow through the body of the molten glass from the first electrode means to the second electrode means thereby to cause the cations and the anions within the glass nearer said surface area to transfer to a greater extent toward the second electrode means and the first electrode means, respectively, the cations and anions which have reached the electrode means being extracted out of the glass;

e. whereby the concentrations of the cations and the anions within the part of the glass nearer said surface area are lowered to a greater extent and the refractive index of the part of the glass nearer said surface area is thus reduced to a greater extent whereby concentrations within the glass filament of said cations and said anions both decrease continuously from the center axis toward the outer surface of the filament in any cross section thereof perpendicular to the center axis thereof, the variations in concentrations of cations and anions within the glass filament producing said distribution of refractive index.

* * * * *